US006580970B2

(12) United States Patent
Matsuda et al.

(10) Patent No.: US 6,580,970 B2
(45) Date of Patent: Jun. 17, 2003

(54) ARM STRUCTURE OF HUMAN-TYPE ROBOT

(75) Inventors: Hiroshi Matsuda, Wako (JP); Hideaki Takahashi, Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/988,027

(22) Filed: Nov. 16, 2001

(65) Prior Publication Data

US 2002/0062179 A1 May 23, 2002

(30) Foreign Application Priority Data

Nov. 17, 2000 (JP) ........................................ 2000-351745

(51) Int. Cl.[7] .............................................. G06F 19/00
(52) U.S. Cl. ....................... 700/245; 700/246; 700/247; 700/249; 700/250; 700/251; 700/253; 700/259; 700/262; 700/264; 318/568.1; 318/568.12; 318/568.2; 901/1; 901/9; 901/46; 901/47; 901/48; 701/23
(58) Field of Search ................................ 700/245–247, 700/250, 251, 253, 249, 260, 259, 264, 262; 318/568.1, 568.12, 568.2; 901/1, 9, 46–48; 701/23; 180/8.6; 414/217, 783, 226.01, 411, 416.03, 730, 754; 74/490.03

(56) References Cited

U.S. PATENT DOCUMENTS

| 2,553,830 | A |   | 5/1951 | Motis |           |
|-----------|---|---|--------|-------|-----------|
| 4,626,164 | A |   | 12/1986 | Chang |          |
| 5,369,346 | A | * | 11/1994 | Takahashi et al. | 318/568.17 |
| 5,378,969 | A | * | 1/1995 | Haikawa | 318/568.12 |
| 5,402,050 | A | * | 3/1995 | Ozawa | 318/568.12 |
| 5,404,086 | A | * | 4/1995 | Takenaka et al. | 318/568.12 |
| 5,416,393 | A | * | 5/1995 | Gomi et al. | 318/568.2 |
| 5,581,166 | A |   | 12/1996 | Eismann et al. | |
| 5,594,644 | A | * | 1/1997 | Hasegawa et al. | 318/567 |
| 5,697,256 | A | * | 12/1997 | Matteo | 74/490.04 |
| 5,737,217 | A | * | 4/1998 | Nishikawa et al. | 700/56 |
| 5,872,893 | A | * | 2/1999 | Takenaka et al. | 700/245 |
| 6,021,363 | A | * | 2/2000 | Nishikawa et al. | 700/253 |
| 6,243,623 | B1 | * | 6/2001 | Takenaka et al. | 700/245 |

FOREIGN PATENT DOCUMENTS

| DE | 2228598 | * | 1/1974 |
| EP | 0 661 614 A2 | * | 12/1994 |
| EP | 1 060 383 A1 | * | 11/2000 |
| EP | 1 103 450 A1 | * | 11/2000 |
| JP | 2000-218589 | | 8/2000 |

OTHER PUBLICATIONS

Nicholls, Bipedal dynamic walking in robotics, 1998, Internet, pp. 1–74.*

(List continued on next page.)

Primary Examiner—William A. Cuchlinski, Jr.
Assistant Examiner—McDieunel Marc
(74) Attorney, Agent, or Firm—Squire, Sanders & Dempsey LLP

(57) ABSTRACT

An upper arm portion and a lower arm portion are connected to each other by a substantially cylindrical elbow joint, and are bendable between an extended position in which they are extended into a substantially straight line and a bent position in which they are bent forwards from the extended position. The position of an axis of the elbow joint is offset forwards from the center of the width of the upper and lower arm portions, and slants inclined toward the elbow joint are formed on rear surfaces of the upper and lower arm portions connected to the elbow joint. Thus, when the lower arm portion is turned toward the bent position, a foreign matter can be prevented from being sandwiched between the upper and lower arm portion at a location in front of the elbow joint by displacing the position of the axis of the elbow joint forwards. In addition, when the lower arm portion is turned rearwards toward the extended position, a foreign matter can be prevent from being sandwiched between the upper and lower arm portion at a location in the rear of the elbow joint by forming the slants.

3 Claims, 5 Drawing Sheets

OTHER PUBLICATIONS

Hirai et al. The development of Honda humanoid robot, 1998, IEEE, pp. 1321–1326.*

Hwang et al., Motion planning of eye, hand and body of humanoid robot, 1997, IEEE, pp. 231–236.*

Atkenson et al., Using humanoid robot to study human behavior, 2000, Internet, pp. 46–56.*

Adams et al., Humanoid Robotis: A new king of tool, 2000, Internet, pp. 20–31.

Ishiguro et al., Robotive: A robot generates episode chanins of our daily file, Apr. 2001, Internet, pp. 1–6.

Price et al., A lightweight plastic robotic humanoid, 2000, Internet/IEEE, pp. 1571–1576.

Konno et al., Development of a light–weight biped humanoid robot, IEEE, 2000, pp. 1565–1570.

Konno et al., Development of a humanoid robot Saika, 1997, Intelligent Robots and Systems, pp. 805–810.

Aramaki et al., Development of autonomous mobile humanoid robot, 1999, IEEE, pp. 529–534.

Hirai et al., Current and future perspectie of honda humanoid robot, 1997, IEEE, pp. 500–508.

Dasgupta et al., Making feasible walking motion of humanoid robots from human motion capture data, 1999, IEEE, pp. 1044–1049.

* cited by examiner

ARM STRUCTURE OF HUMAN-TYPE ROBOT

BACKGROUND OF THE INVENTION

1. Field of the Invention

The present invention relates to an arm structure of a human-type robot, and particularly to an arm structure designed so that when an elbow joint connecting an upper arm portion and a lower arm portion to each other is bent, an object is prevented from being sandwiched between a lower end of the upper arm portion and an upper end of the lower arm portion.

2. Description of the Related Art

There is an animal-type robot capable of walking by four legs, which is known from Japanese Patent Application Laid-open No.2000-218589, wherein each of the four legs is divided into an upper leg portion and a lower leg portion, which are connected to each other by a substantially cylindrical joint, so that they can be bent.

In the above known robot, an axis of the joint is disposed substantially at the center of the width of the upper and lower leg portions as viewed in a direction of the axis of the joint. For this reason, when the upper and lower leg portions are bent into V-shape, there is a possibility that a foreign matter is sandwiched between the upper and lower arm portions in the vicinity of the joint, whereby a smooth operation of the joint may be hindered.

SUMMARY OF THE INVENTION

Accordingly, it is an object of the present invention to prevent a foreign matter from being sandwiched between the upper and lower arm portions at a location corresponding to the elbow joint of the human-type robot to hinder the smooth operation of the joint.

To achieve the above object, according to the present invention, there is provided an arm structure of a human-type robot in which an upper arm portion and a lower arm portion are connected to each other by a substantially cylindrical elbow joint so that they can be bent, the upper and lower arm portions having a width larger than the diameter of the elbow joint as viewed in a direction of an axis of the elbow joint, and being bendable in a limited range between an extended position in which they are extended into a substantially straight line and a bent position in which they are bent in one direction from the extended position, wherein the position of the axis of the elbow joint is offset in the one direction from the center of the width of the upper and lower arm portions, and a lower end of the upper arm portion and an upper end of the lower arm portion, which are connected to the elbow joint, are decreased in width toward the elbow joint on a side opposite from the one direction.

With the above arrangement, the position of the axis of the substantially cylindrical elbow joint is offset in the one direction from the center of the width of the upper and lower arm portions (in a direction of bending of the upper and lower arm portions from the extended position to the bent position). Therefore, when the upper and lower arm portions are bent in the one direction from the extended position to the bent position, it is difficult for a gap, into which a foreign matter may enter, to be defined between the upper and lower arm portions in the vicinity of the joint. Thus, it is possible to reliably prevent the foreign matter from being sandwiched between the upper and lower arm portions in the vicinity of the joint. In addition, the widths of the lower end of the upper arm portion and an upper end of the lower arm portion, which are connected to the elbow joint, are decreased toward the elbow joint on the side opposite from the one direction. Therefore, when the upper and lower arm portions are bent in the one direction from the bent position to the extended position, it is difficult for a gap, into which a foreign matter may enter, to be defined between the upper and lower arm portions in the vicinity of the joint. Thus, it is possible to reliably prevent the foreign matter from being sandwiched between the upper and lower arm portions in the vicinity of the joint.

The above and other objects, features and advantages of the invention will become apparent from the following description of the preferred embodiment taken in conjunction with the accompanying drawings.

BRIEF DESCRIPTION OF THE DRAWINGS

FIGS. 1 to 5 show an embodiment of the present invention, wherein

FIG. 1 is a front view of a human-type robot;

FIG. 2 is a left side view of the human-type robot;

FIG. 3 is an enlarged sectional view taken along a line 3—3 in FIG. 1;

FIG. 4 is a sectional view taken along a line 4—4 in FIG. 3; and

FIG. 5 is a view taken in a direction of an arrow 5 in FIG. 3.

DESCRIPTION OF THE PREFERRED EMBODIMENT

The present invention will now be described by way of an embodiment of the present invention with reference to the accompanying drawings.

Figure 1:
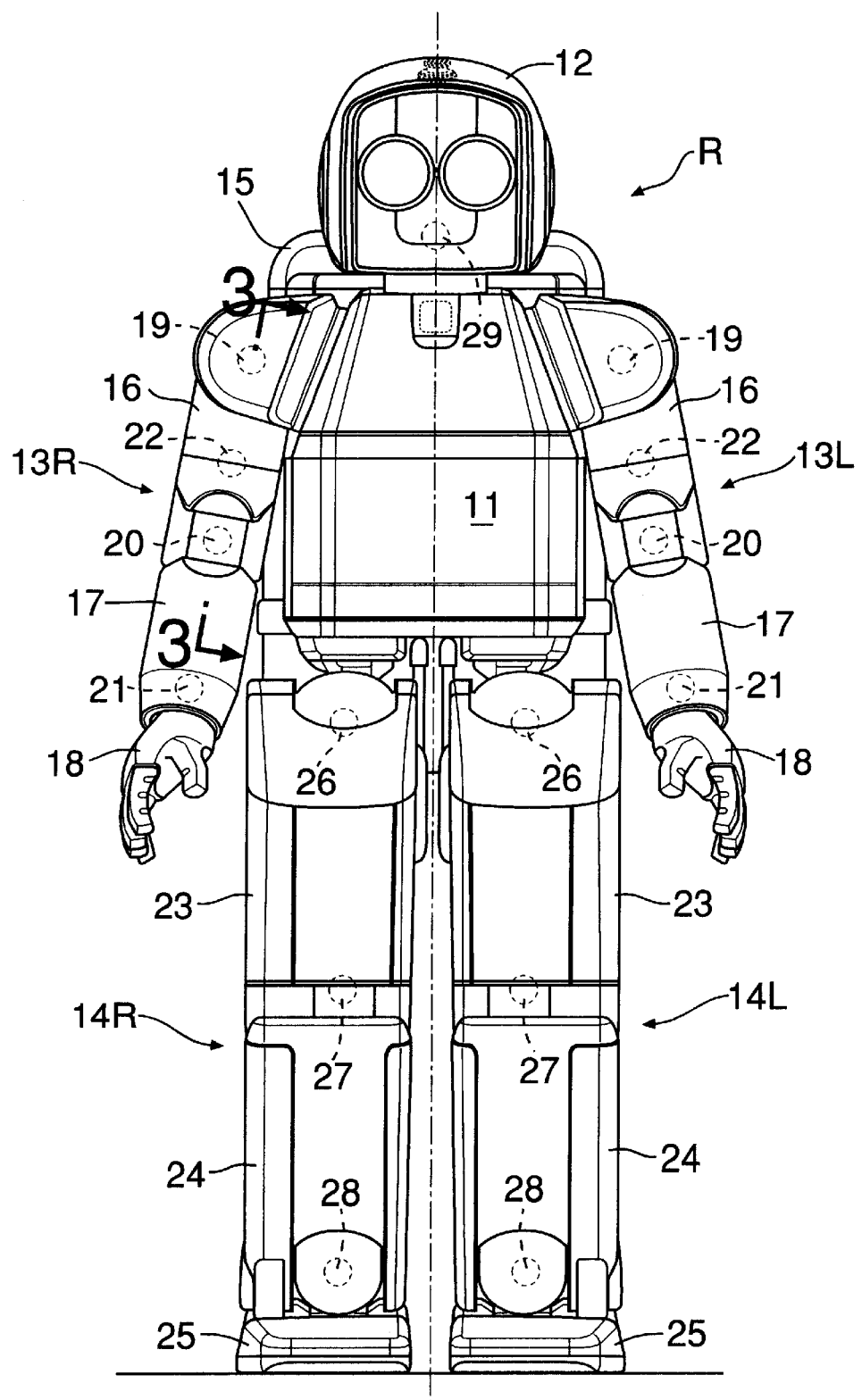
Figure 2:
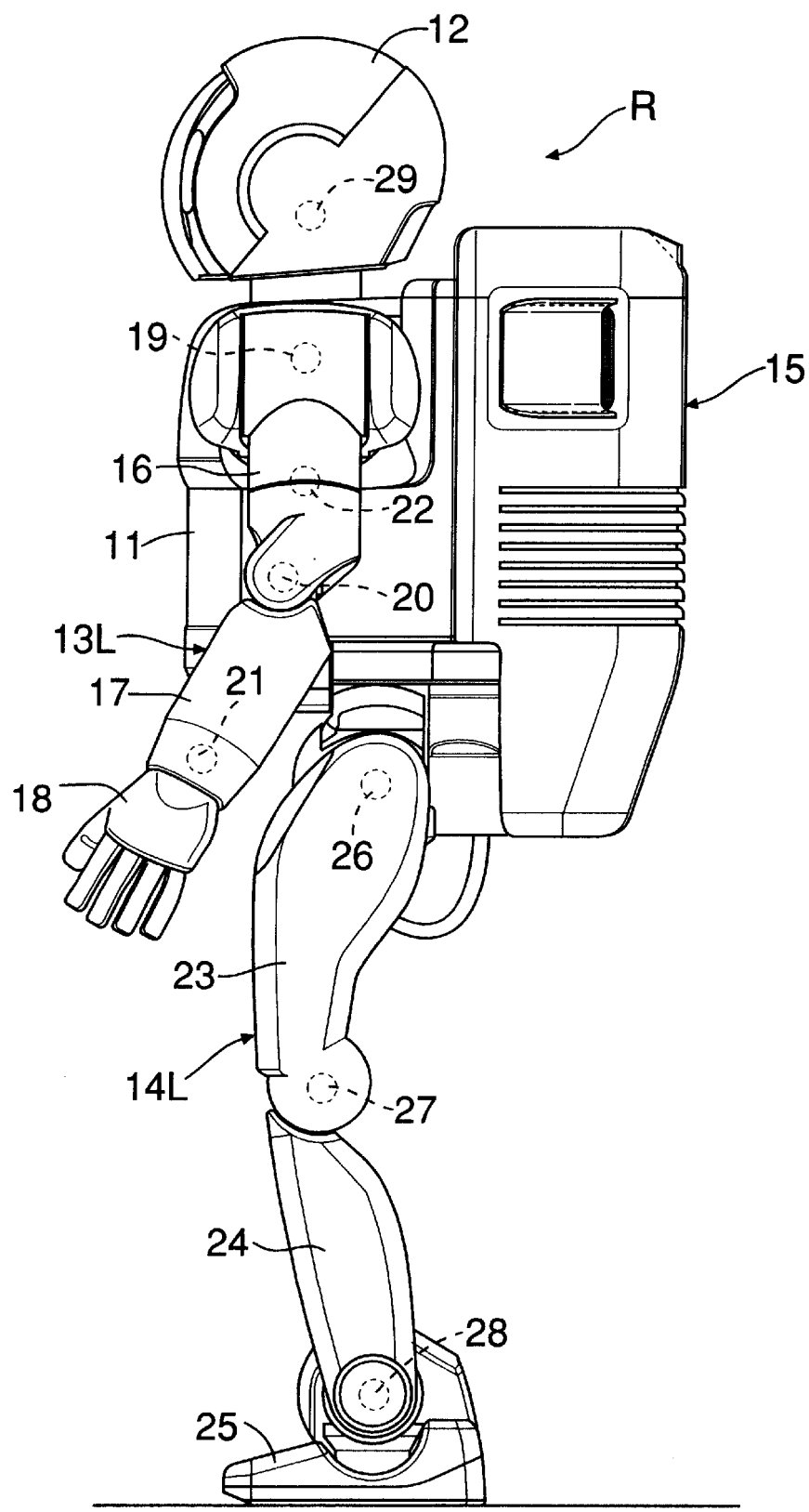

Referring to FIGS. 1 and 2, a human-type robot R capable of self-walking by two legs includes a body 11, a head 12, a left arm 13L, a right arm 13R, a left leg 14L and a right leg 14R, and carries an electric equipment box 15 having electric equipment accommodated therein on a back of the body 11. Each of the left arm 13L and the right arm 13R is comprised of an upper arm portion 16, a lower arm portion 17 and a hand portion 18. The body 11 and the upper arm portion are 16 are connected to each other by a shoulder joint 19; the upper arm portion 16 and the lower arm portion 17 are connected to each other by an elbow joint 20, and the lower arm portion 17 and the hand portion 18 are connected to each other by a wrist joint 21. Further, an upper arm joint 22 for twisting lower half relative to upper half of the upper arm portion 16 is provided at a lengthwise intermediate portion of the upper arm portion 16. Each of the left leg 14L and the right leg 14R is comprised of an upper leg portion 23, a lower leg portion 24 and a foot portion 25. The body 11 and the upper leg portion 23 are connected to each other by crotch joint 26; the upper leg portion 23 and the lower leg portion 24 are connected to each other by a knee joint 27, and the lower leg portion and the foot portion 25 are connected to each other by an ankle joint 28. Further, the body 11 and the head 12 are connected to each other by a neck joint 29. Only the position of each of the joints is shown by a broken circle in FIGS. 1 and 2.

Figure 4:
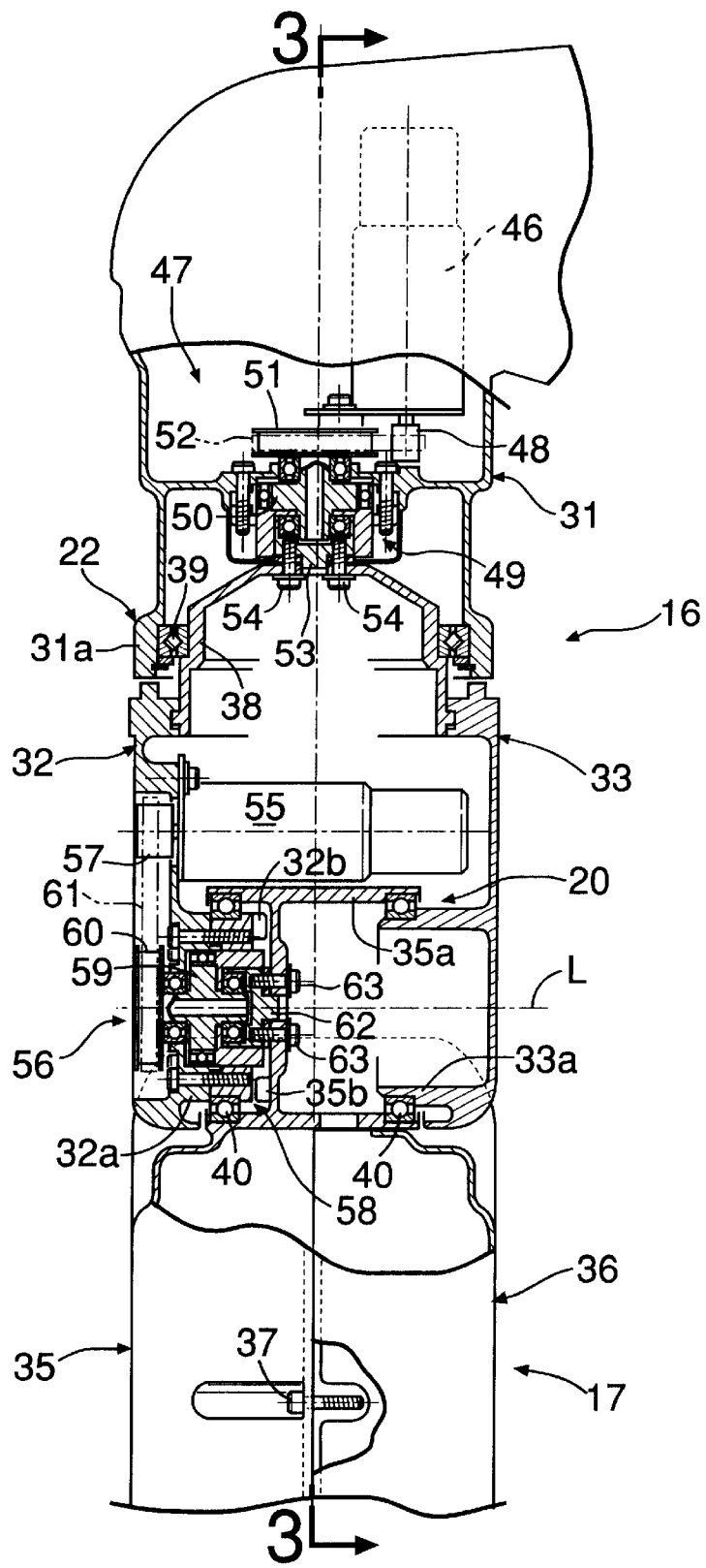
Figure 5:
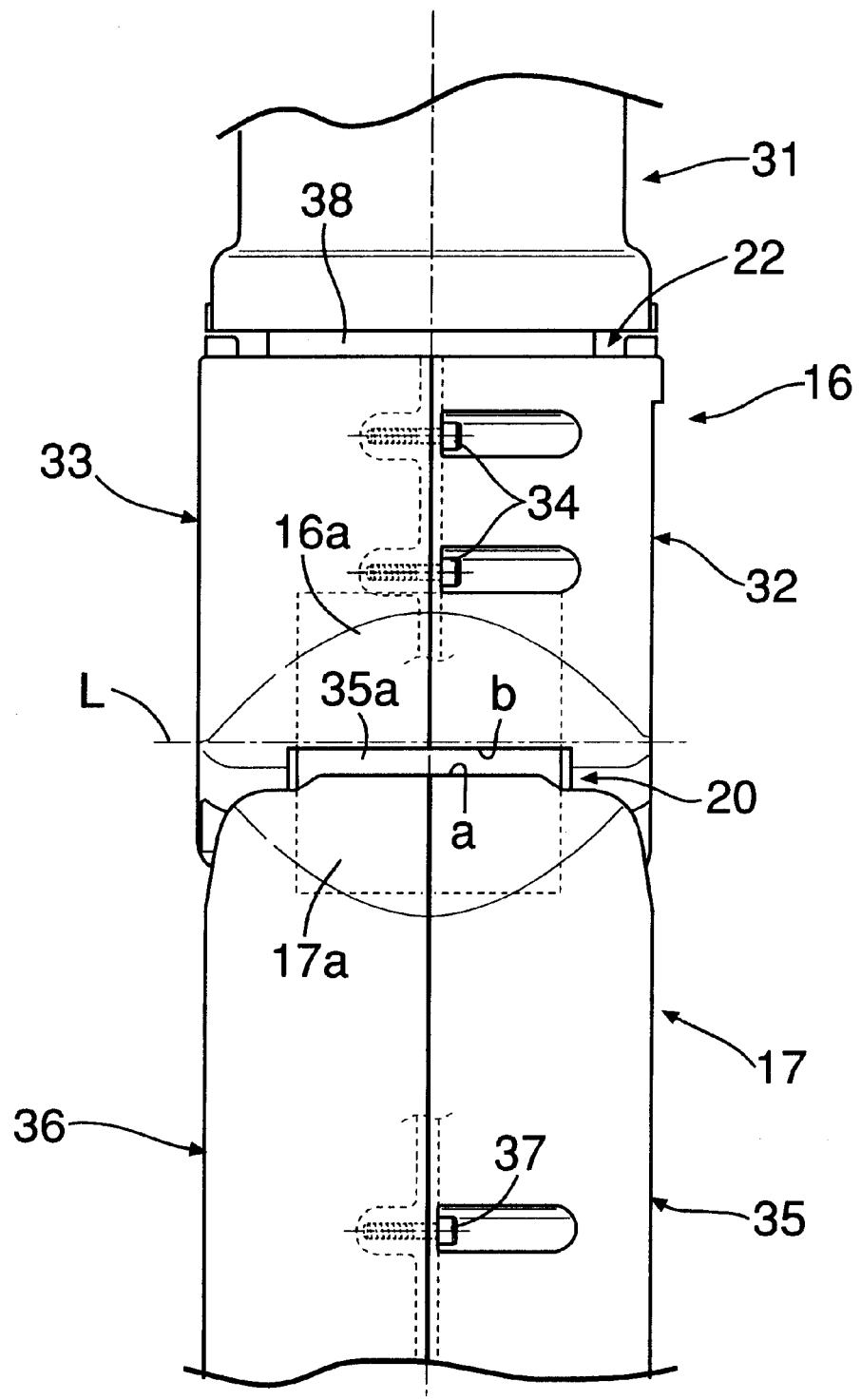

The structure of the right arm 13R of the robot R will be described below with reference to FIGS. 3 to 5. The left arm 13L is of the same specularly symmetrical structure as the right arm 13R, and hence, the duplicated description is omitted.

The upper arm portion 16 has a housing, which is divided into an upper arm housing upper 31, an upper arm housing lower outer 32, and an upper arm housing lower inner 33. The upper arm housing lower outer 32 located at an outer side (at a side farther from the body 11) and the upper arm housing lower inner 33 located at an inner side (at a side nearer to the body 11) are coupled to each other by a plurality of bolts 34 (see FIG. 5). The lower arm portion 17 has a housing, which is divided into a lower arm housing outer 35, and a lower arm housing inner 36. The lower arm housing outer 35 located at an outer side (at a side farther from the body 11) and the lower arm housing inner 36 located at an inner side (at a side nearer to the body 11) are coupled to each other by a plurality of bolts 37 (see FIGS. 4 and 5). Outer peripheries of the upper arm housing upper 31, the upper arm housing lower outer 32, the upper arm housing lower inner 33, the lower arm housing outer 35 and the lower arm housing inner 36 are covered with a cover (not shown in FIGS. 3 to 5).

A cup-shaped inner shell member 31a is fixed between upper ends of the upper arm housing lower outer 32 and the upper arm housing lower inner 33, and the inner shell member 38 is relatively rotatably coupled to an inner periphery of an outer shell portion 31a formed at a lower end of the upper arm housing upper 31 with a cross roller bearing 39 interposed therebetween. Therefore, the substantially cylindrical upper arm joint 22 is constituted by the inner shell member 38, the outer shell portion 31a of the upper arm housing upper 31 and the cross roller bearing 39. In addition, an outer shell portion 35a formed by an upper end of the lower arm housing outer 35 and inner shell portions 32a and 33a formed at lower ends of the upper arm housing lower outer 32 and the upper arm housing lower inner 33, are relatively rotatably coupled to each other by a pair of ball bearings 40, 40, respectively. Therefore, the substantially cylindrical elbow joint 20 is constituted by the outer shell portion 35a of the lower arm housing outer 35, the inner shell portion 32a of the upper arm housing lower outer 32, the inner shell portion 33a of the upper arm housing lower inner 33 and the pair of the ball bearings 40, 40.

An upper arm joint driving device 47 for driving the upper arm joint 22 is mounted between a motor 46 supported on the upper arm housing upper 31 and the inner shell member 38. More specifically, a drive pulley 48 mounted on an output shaft of the motor 46 and a follower pulley 51 mounted on an input member 50 of a harmonic reducer (a trade name) 49 are connected to each other by an endless belt 52, and an output member 53 of the harmonic reducer 49 is fixed to the inner shell member 38 by a plurality of bolts 54. The harmonic reducer 49 reduces the rotation of the input member 50 disposed coaxially therewith to output it to the output member 53. The structure of the harmonic reducer 49 is known and hence, the description thereof is omitted. A reducer using a planetary gear mechanism may be employed in place of the harmonic reducer 49.

However, the rotation of the motor 46 for driving the upper arm joint 22 is reduced by the drive pulley 48, the endless belt 52 and the follower pulley 51, further reduced by the harmonic reducer 49, and transmitted to the inner shell member 38, thereby rotating the upper arm housing lower outer 32 and the upper arm housing lower inner 33 relative to the upper arm housing upper 31.

An elbow joint driving device 56 for driving the elbow joint 20 is mounted between a motor 55 supported on the upper arm housing lower outer 32 and the outer shell portion 35a of the lower arm housing outer 35. More specifically, a drive pulley 57 mounted on an output shaft of the motor 55 and a follower pulley 60 mounted on an input member 59 of a harmonic reducer 58 are connected to each other by an endless belt 61, and an output member 62 of the harmonic reducer 58 is fixed to the outer shell portion 35a of the lower arm housing outer 35 by a plurality of bolts 63. Thus, the rotation of the motor 55 for driving the elbow joint 20 is reduced by the endless belt 61 and the follower pulley 60, further reduced by the harmonic reducer 58, and transmitted to the outer shell portion 35a of the lower arm housing outer 35, thereby rotating the lower arm portion 17 relative to the upper arm portion 16.

Figure 3:
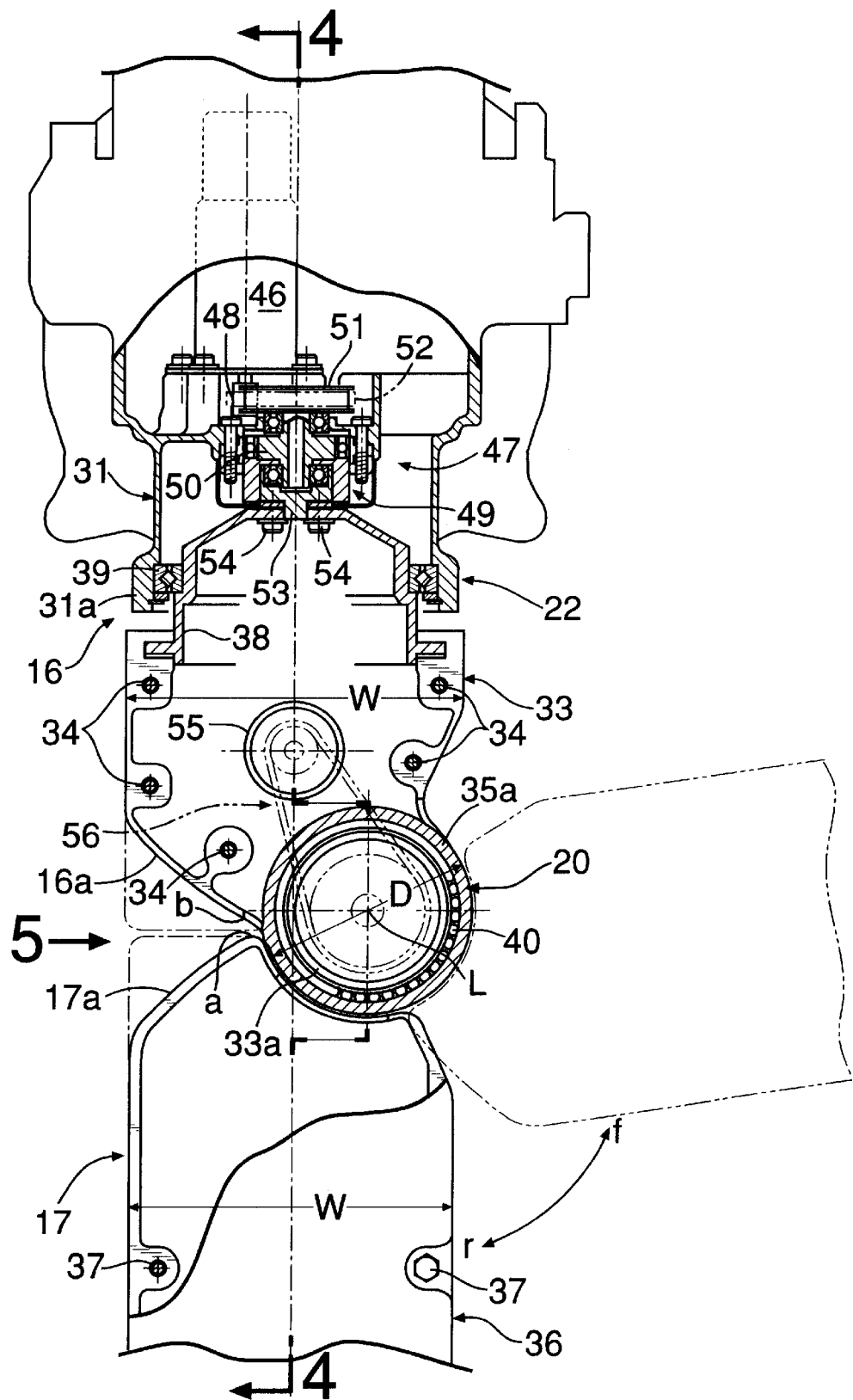

As can be seen from FIG. 3, the diameter D of the substantially cylindrical elbow joint 20 is smaller than the width W of the upper arm portion 16 and the lower arm portion 17 as viewed in a direction of an axis L of the elbow joint 20, and the position of the axis L of the elbow joint 20 is offset forwards (rightwards in FIG. 3) from the center of the width W. By offsetting the position of the axis L of the elbow joint 20 is offset forwards, an unevenness of front surfaces (right sides in FIG. 3) of the upper arm portion 16 and the lower arm portion 17 in the vicinity of the elbow joint 20 is reduced, and when the elbow joint 20 is turned forwards about the elbow joint 20 (in a direction of an arrow f) from an extended position shown by a solid line toward a bent position shown by a double-dotted chain line, it is difficult to sandwich a foreign matter between the upper arm portion 16 and the lower arm portion 17.

Even when the lower arm portion 17 is turned through an acute angle relative to the upper arm portion 16, there is a possibility that a foreign matter is sandwiched between the upper arm portion 16 and the lower arm portion 17. However, the range of forward turning movement of the lower arm portion 17 can be restricted to prevent the sandwiching of the foreign matter by bringing a mechanical stopper 32b provided on the inner shell portion 32a and a mechanical stopper 35b provided on the outer shell portion 35a into abutment against each other, as shown in FIG. 4. In place of provision of the mechanical stoppers 32b and 35b, the rotation of the motor 55 of the elbow joint driving device 56 may be controlled to restrict the range of forward turning movement of the lower arm portion 17.

Slants 16a and 17a are formed on rear surfaces (left sides in FIG. 3) of the upper arm portion 16 and the lower arm portion 17 in the vicinity of the elbow joint 20 so that the width W is decreased toward the elbow joint 20. The lower arm portion 17 is turnable through a very small angle (a few degrees) in a rearward direction shown by an arrow r from the extended position shown by the solid line in FIG. 3, and the limit of such turning movement is defined by the abutment of a stopper portion a of the slant 17a of the lower arm portion and a stopper portion b provided on the slant 16a of the upper arm portion 16.

If the slants 16a and 17a are not provided on the rear surfaces of the upper arm portion 16 and the lower arm portion 17 in the vicinity of the elbow joint 20, as shown by a single-dotted chain line in FIG. 3, when the lower arm portion 17 is turned in the direction of the arrow r to the bent position shown by the double-dotted chain line, there is a possibility that a foreign matter is sandwiched between sections of the upper and lower arm portions 16 and 17 shown by the single-dotted chain line. In the present embodiment, however, it is possible to reliably prevent a foreign matter is sandwiched between the upper and lower arm portions 16 and 17 by forming the slants 16a and 17a on the rear surfaces of the upper and lower arm portions 16 and 17.

As described above, the position of the axis L of the elbow joint 20 is offset forwards and hence, when the lower arm portion 17 is turned forwards from the extended position toward the bent position, a foreign matter can be prevented from being sandwiched between the upper and lower arm portions 16 and 17 in the vicinity of the elbow joint 20. In addition, since the slants 16a and 17a are formed on the rear surfaces of the upper and lower arm portions 16 and 17 in the vicinity of the elbow joint 20, when the lower arm portion 17 is turned rearwards from the bent position toward the extended position, a foreign matter can be prevented from being sandwiched between the upper and lower arm portions 16 and 17 in the vicinity of the elbow joint 20. Thus, a smooth operation of the elbow joint 20 can be always ensured.

Although the embodiment of the present invention has been described in detail, it will be understood that the present invention is not limited to the above-described embodiment, and various modifications in design may be made without departing from the spirit and scope of the invention defined in the claim.

What is claimed is:

1. An arm structure of a human-type robot in which an upper arm portion and a lower arm portion are connected to each other by a substantially cylindrical elbow joint so that they can be bent, said upper and lower arm portions each having a width larger than the diameter of said elbow joint as viewed in a direction of an axis of the elbow joint, and being bendable in a limited range between an extended position in which they are extended into a substantially straight line and a bent position in which they are bent in one direction from said extended position, wherein the position of the axis of said elbow joint is offset in said one direction from the center of the width of said upper and lower arm portions, and a lower end of said upper arm portion and an upper end of said lower arm portion, which are connected to the elbow joint, are decreased in width toward said elbow joint on a side opposite from said one direction.

2. An arm structure of a human-type robot according to claim 1, wherein said elbow joint comprises therein stoppers which abut against each other in order to restrict a range within which said elbow joint can be bent.

3. An arm structure of a human-type robot according to claim 1, wherein each of said upper arm portion and said lower arm portion comprises a stopper which abuts against the other stopper in order to restrict a range within which said elbow joint can be bent.

* * * * *